June 17, 1924.                                                      1,498,023
                          E. N. FALES
           METHOD OF AND MEANS FOR AERODYNAMIC TESTING
                   Filed April 18, 1922      2 Sheets-Sheet 1
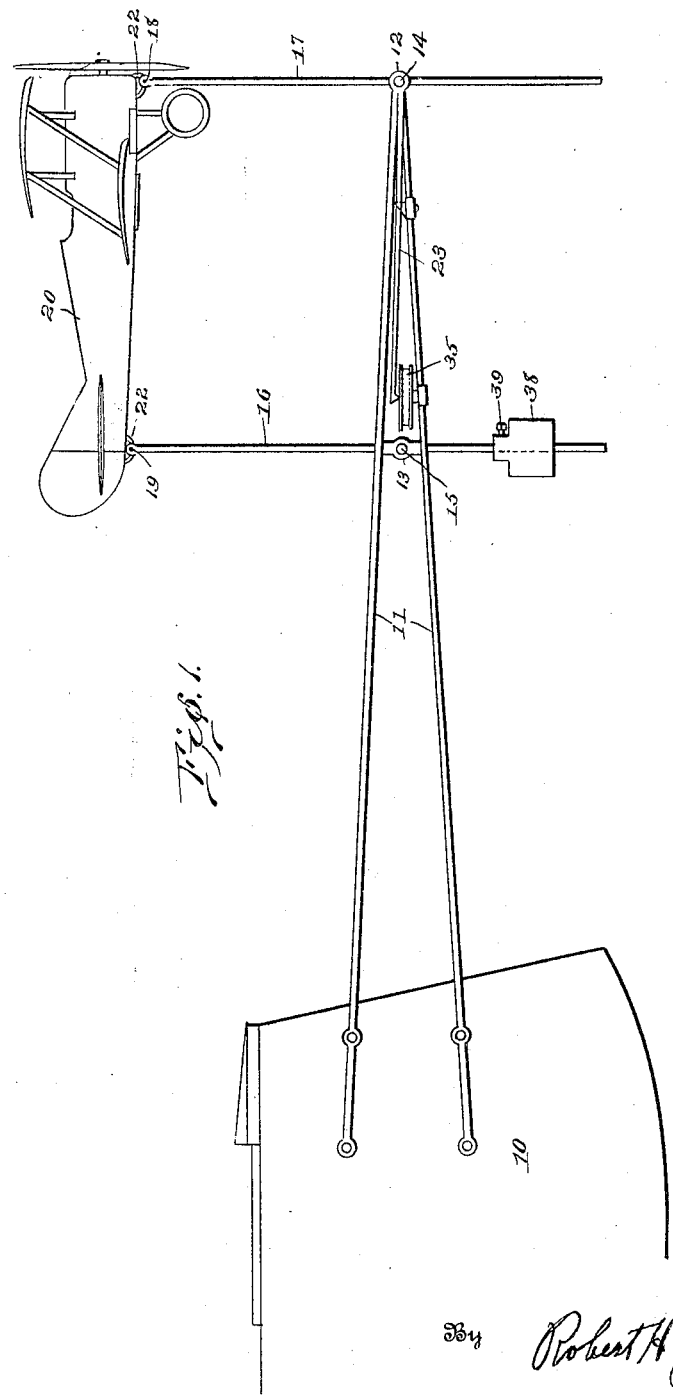
Inventor
Elisha N. Fales
By Robert H. Young
                              Attorney June 17, 1924.
E. N. FALES
1,498,023
METHOD OF AND MEANS FOR AERODYNAMIC TESTING
Filed April 18, 1922  2 Sheets-Sheet 2
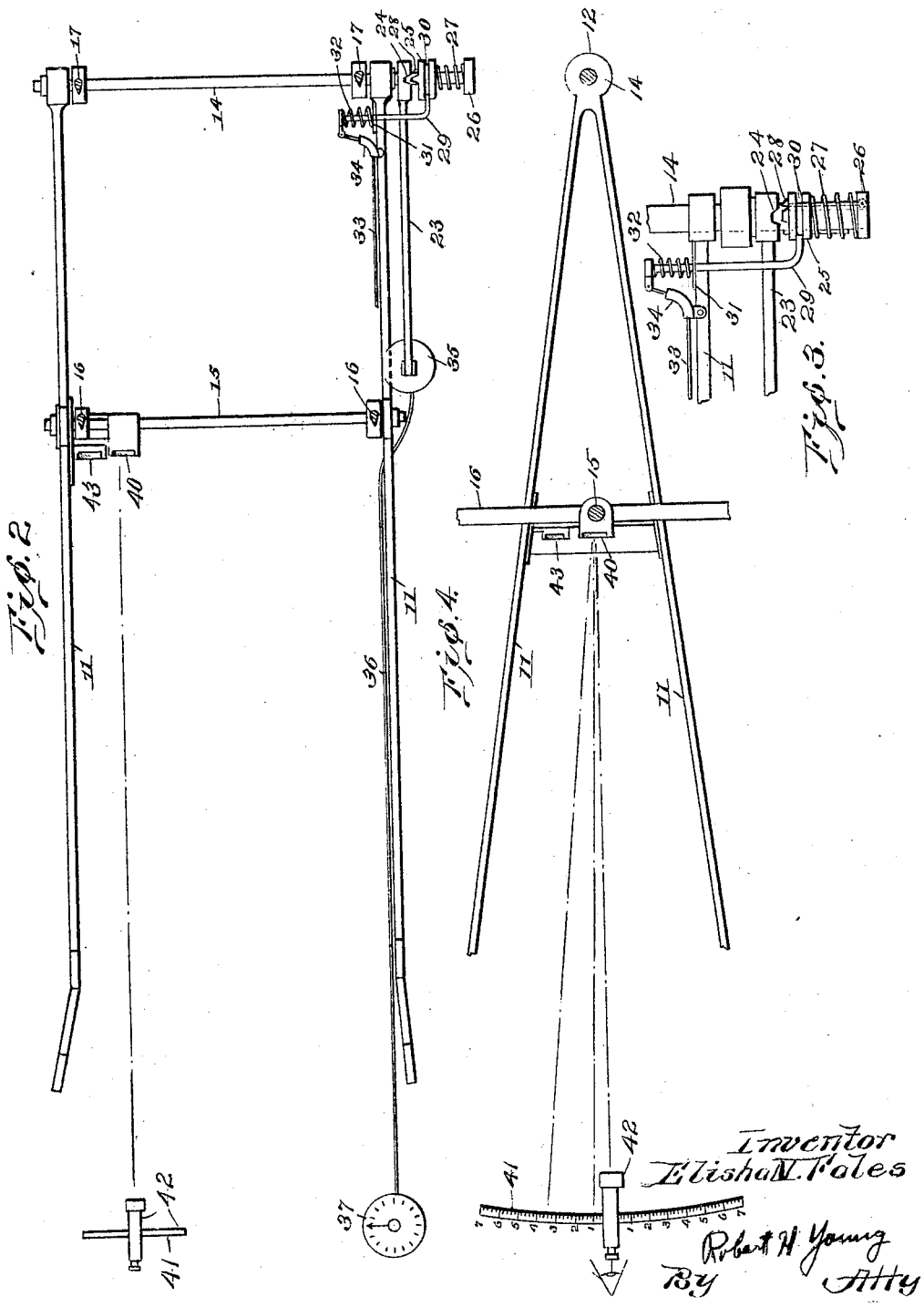

Patented June 17, 1924.

1,498,023

UNITED STATES PATENT OFFICE.

ELISHA N. FALES, OF DAYTON, OHIO.

METHOD OF AND MEANS FOR AERODYNAMIC TESTING.

Application filed April 18, 1922. Serial No. 555,365.

*To all whom it may concern:*

Be it known that I, ELISHA N. FALES, a citizen of the United States, residing at Dayton, in the county of Montgomery and State of Ohio, have invented certain new and useful Improvements in Methods of and Means for Aerodynamic Testing, of which the following is a specification.

This invention relates to means for the aerodynamic testing of airplanes or parts thereof.

Heretofore it has been customary to test models of airplanes or the aerofoils thereof in a wind tunnel but according to this invention a model of the airplane or any part thereof is tested in an actual outdoor flight. In this manner actual flying conditions are encountered whereas in a wind tunnel these actual conditions can only be closely simulated.

In carrying out my invention a model of any portion of an aircraft on which technical data is desired, is mounted on a special supporting frame of an airplane in such manner that when the airplane flies the model is subjected to the same air flow as the airplane itself, and the resulting forces are recorded by suitable indicating devices. It is apparent that a model of the size and form usually tested in a wind tunnel may also be tested in actual flight, toward the end of corroborating or checking the wind tunnel data.

The invention is hereinafter described in connection with the accompanying drawings, in which:

Figure 1 is a side elevation of the mechanism for supporting the airplane model on a real airplane;

Figure 2 is a plan view of a portion of the supporting mechanism;

Figure 3 is a detail plan view of the clutch; and

Figure 4 is a vertical section showing the angle measuring system.

The numeral 10 designates the fuselage of an airplane of the bomber type. Fixed to and projecting in substantially parallel relation from the fuselage are a pair of spaced outriggers 11 which taper outwardly to a vertex 12 and are formed with intermediate webs 13. At the vertex 12 and the center of web 13 are formed openings adapted to receive rotatable cross shafts 14, 15. Upon each of said shafts is secured a pair of parallel links 16, 17, which are joined at their upper ends by rods 18, 19. The airplane model 20 is mounted on said rods by any suitable means such as clips 21, 22 attached to the fuselage and tail post thereof.

The shaft 14 is extended beyond one of the outriggers and an arm 23 is rotatably mounted on this extension. Notches 24 are formed in the hub of said arm and a clutch member 25 splined to the shaft extension is provided with teeth adapted to engage said notches for the purpose of rotating the arm with the shaft. A collar 26 is fixed on the end of the shaft extension and a spring 27 compressed between said collar and the clutch member normally tends to throw the latter into engagement with the notches 24. A spring latch 28 riveted at one end to the collar 26 is adapted to engage the clutch member when it is in retracted position and maintain the clutch teeth clear of the notches 24 until manually released. Means are provided for releasing the clutch member from operative engagement with the arm, said means comprising a curved finger 29 adapted to engage in a circumferential groove 30 in the clutch member. This finger passes through an aperture in a plate 31 attached to one of the outriggers and is spring pressed by a spring 32, to urge the clutch member to operative position. However, a flexible connection 33 is attached at one end to the finger and extends through a curved guide tube 34 to the cockpit. A pull on the flexible connection will force the clutch member out of engagement with arm 23 until it is automatically locked in inoperative position by the latch 28.

The free end of the arm 23 bears against the movable head of a sylphon 35 attached to the outrigger frame-work and a tube 36 connects the sylphon to a pressure gauge 37 in the cockpit whereby a direct reading of the drag on the airplane model may be obtained.

The links 16 and 17 are extended below the shafts 14, 15 and some of them are provided with slidable counterweights 38 which may be held in adjusted position by thumbscrews 39. These extensions and counterweights are for the purpose of counterbalancing both the weight and resistance of the upper portions of the linkage. In order to indicate the angle assumed by the links, a three piece mirror 40 is attached to the hub of one of the links 16. A telescope 41 located in the cockpit above a scale 42 is directed towards the mirrors. The observer at the telescope sees in the mirror an image of the scale and the reading of the scale thus seen varies directly with the angle through which the mirror turns. When the reading from one mirror runs off the scale another mirror takes its place. A fixed mirror 43 is attached to the outrigger frame adjacent the movable mirrors. This mirror is in the field of view of the telescope and any deflection of the supporting framework such as might come into existence under the stresses of a flight test is indicated by the image of the scale in the fixed mirror. The true angular motion of the rotating links is then the algebraic sum of the readings observed in the fixed and movable mirrors.

With the resistance of the sylphon removed from the rotatable links, by disengaging the clutch member 25 from arm 23, the links take up an angular position and point in the direction of the resultant air force on the model. This angular position is indicated on the scale 42 and is a function of the efficiency, i. e., it determines the ratio of lift to drag.

If desired the pressure from sylphon 35 transmitted to the cockpit may be balanced against the velocity pressure of the airplane and thus the performance of the model in the test may be read as a function of the performance of the machine carrying it.

In operation the clutch 25 is set in engagement with the arm 23 before ascending for the experimental test. Readings of the drag are then obtained during the first portion of the flight because the air forces acting on the model are transmitted by the rotating link 17 to the shaft 14 and through clutch member 25 to arm 23 which presses on the sylphon. The clutch member 25 is then disengaged from arm 23 by pulling on flexible connection 33 whereupon the linkage system is free to take an angular position in relation to the plane of the axes of shafts 14 and 15 dependent upon the direction and intensity of the resultant air force on the model. This angular position is read on the scale 42 by means of the telescope and movable mirrors and is a function of the efficiency of the airplane model. It will be understood that the linkage system may be supported from other parts of the larger aircraft and that other changes may be made in the invention as herein illustrated and described without departing from the spirit and scope thereof.

I claim:

1. The combination with an aircraft, of a smaller aircraft movably mounted on a fixed support on said aircraft, and means operated by the movements of said smaller aircraft while in flight for indicating the performance characteristics of said smaller aircraft.

2. The combination with an aircraft, of a smaller aircraft movably mounted on a fixed support on said aircraft, and means operated by the movements of an airplane while in flight for indicating the efficiency of said airplane.

3. The combination with an aircraft, of a smaller aircraft movably mounted on a fixed support on said aircraft, and means operated by the movements of an airplane while in flight for indicating the drag of said airplane.

4. The combination with an aircraft, of a smaller aircraft movably mounted on a fixed support on said aircraft, and means operated by the movements of an airplane while in flight for indicating the drag of said airplane, devices for rendering said last named means inoperative, and mechanism for indicating the efficiency of said airplane.

5. The combination with an aircraft having supporting means attached thereto, rotatable links mounted in said supporting means, an airplane model carried by said links, and means for indicating the magnitude of the angular movement of said links due to the aerodynamic forces acting on said airplane.

6. The combination with an aircraft having supporting means attached thereto, rotatable links mounted in said supporting means, an airplane model carried by said links, an arm adapted to be releasably connected to said links for rotation therewith, and an indicating device actuated by said arm.

7. The combination with an aircraft having a rigid frame attached thereto, rotatable links mounted in said frame, an airplane model carried by said links, means for indicating the magnitude of the angular movement of said links due to the aerodynamic forces acting on said airplane, and devices for indicating the deflection of said frame.

8. The combination with an aircraft having outriggers attached thereto, rotatable links mounted in said outriggers, an airplane model carried by said links, means for counterbalancing the weight and resistance of said links, and means for indicating the magnitude of the angular movement of said links due to the aerodynamic forces acting on said airplane.

In testimony whereof I affix my signature.

ELISHA N. FALES.